United States Patent [19]

Moreira

[11] Patent Number: 4,994,811
[45] Date of Patent: Feb. 19, 1991

[54] SENSITIVITY TIME CONTROL DEVICE

[75] Inventor: Joao Moreira, Landsberg, Fed. Rep. of Germany

[73] Assignee: Deutsche Forschungsanstalt fuer Luft - und Raumfahrt e. V., Cologne, Fed. Rep. of Germany

[21] Appl. No.: 548,796

[22] Filed: Jul. 6, 1990

[30] Foreign Application Priority Data

Jul. 7, 1989 [DE] Fed. Rep. of Germany ....... 3922429

[51] Int. Cl.$^5$ .............................................. G01S 13/34
[52] U.S. Cl. ....................................... 342/205; 342/92
[58] Field of Search .................................. 342/205, 92

[56] References Cited

U.S. PATENT DOCUMENTS

| | | | |
|---|---|---|---|
| 3,231,889 | 1/1966 | Layde et al. | 342/89 |
| 3,525,095 | 8/1970 | Cordry | 342/26 |
| 3,949,398 | 4/1976 | Donahue | 342/92 |
| 4,062,011 | 12/1977 | Preston et al. | 342/94 |
| 4,370,652 | 1/1983 | Lucchi | 342/101 |
| 4,509,050 | 4/1985 | Amoroso, Jr. et al. | 342/91 |
| 4,524,361 | 6/1985 | Teulings | 342/205 |
| 4,529,983 | 7/1985 | Lyall | 342/26 |
| 4,728,953 | 3/1988 | Richmond | 342/91 |

OTHER PUBLICATIONS

C. E. Livingstone et al., "CCRS C/X-Airborne Synthetic Aperture Radar; An R An D Tool For The ERS-1 Time Frame", Canada Center for Remote Sensing, Ottawa, Ontario, Canada, 1988.
M. I. Skolnik, "Radar Handbook", Naval Research Laboratory, pp 5-19 to 5-23, McGraw-Hill, Inc., 1970.

Primary Examiner—Thomas H. Tarcza
Assistant Examiner—John B. Sotomayor
Attorney, Agent, or Firm—Browdy and Neimark

[57] ABSTRACT

In a sensitivity time control device for an imaging radar system with an automatic gain control attenuator, a sensitivity time control attenuator and an analog-digital converter, output signals of the analog-digital converter are applied, via a device (20) generating an average value and a comparator device, to a control device, which has a ideal on-off relay connected with a device for determining its control parameter, an integrating member, switched downstream, and a device for calculating the operating point of the automatic gain control attenuator device. Furthermore, an n-bit digital analog converter is switched downstream of the control device, by means of the analog output voltage of which the sensitivity time control attenuator is controlled. It is possible, with the aid of the sensitivity time control device, to evaluate continuously the backscatter signal of an imaging radar system in real time, so that it is continuously possible in this way to determine an optimal sensitivity time control curve. By means of such an optimal sensitivity time control it is always possible to obtain the average value of the backscatter signal output independent of the range.

1 Claim, 2 Drawing Sheets

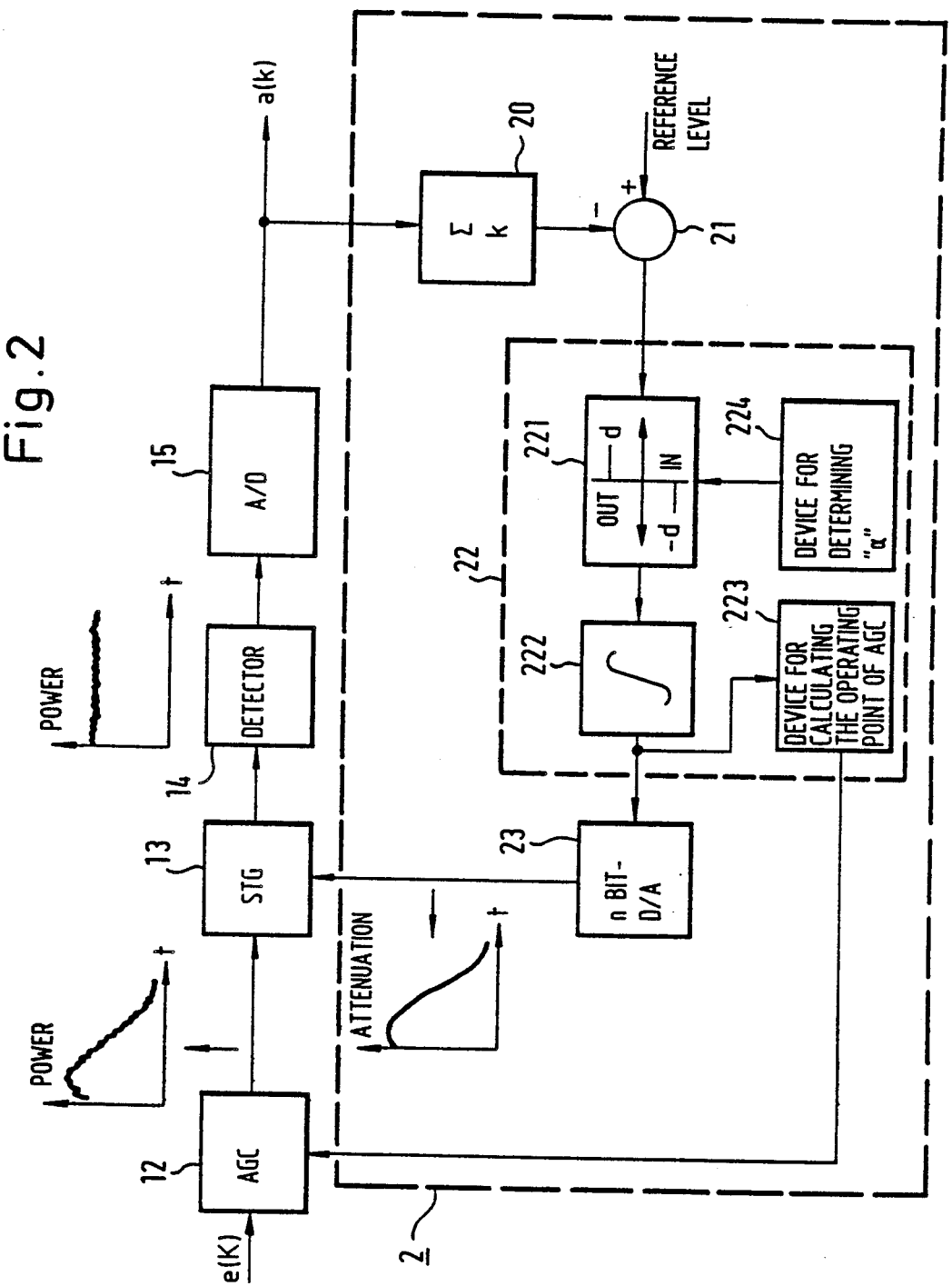

SENSITIVITY TIME CONTROL DEVICE

BACKGROUND OF THE INVENTION

Field of the Invention

The invention relates to a sensitivity time control device in accordance with the preamble of the claim.

With imaging radar systems used today, radar pulses (k) are transmitted by means of an antenna 10, by means of which the backscatter signals e(k) are then received and forwarded to a transmitter-receiver unit 11, where they are down-mixed, as illustrated in the top part of a block diagram in FIG. 1. The Amplitude of the backscatter signals received is changed by means of two attenuators switched in series in the form of an automatic gain control attenuator (AGC) 12 and a sensitivity time control attenuator 13 (or STC unit 13).

A signal detector 14 is placed downstream of the sensitivity time control attenuator (STC) 13 for demodulation and detection. The output signal of the detector 14 is digitally converted in an analog-digital (A/D) converter 15 and forwarded via a formatting unit 16 to a recording unit 17.

Because the backscatter signal e(k) received by means of the antenna 10 can be large with range and may be, for example, up to 50 dB, the dynamic range of the imaging radar system must be correspondingly adapted. As a rule, however, the dynamic range of such a radar system is limited by the analog-digital conversion which has been performed in the converter 15. But without a sensitivity time control by means of the STC attenuator 13, large distortions would occur in the course of analog-digital conversion or corresponding quantization. In this case, the distortions in the course of quantization are the result of the sum of the so-called quantization noise and the saturation noise.

Because there is little or no information available regarding the terrain properties to be represented, it is a disadvantage of the known sensitivity time control device that it is not possible to determine the sensitivity time control curve exactly in advance. The analog-digital converter also cannot be optimally controlled for this reason. With the known time control devices it is necessary to calculate a fresh sensitivity time control curve for each flight geometry or for each system configuration. Because of this, particularly large expenditures are required for the operational use of the imaging radar system over a terrain, the backscatter properties of which are still unknown.

None of the existing sensitivity time control devices evaluates the backscatter signal in real time. Therefore the sensitivity time control curve is either determined in advance, if that is possible, or it must be manually set during the operation. This has been described, for example, in a publication in connection with a CCRS symposium in Canada in 1988 as special issue 88 CH 2572-6/88/0000-0015 of IEEE.

BRIEF SUMMARY OF THE INVENTION

It is therefore the object of the invention to provide a sensitivity time control device in which an optimal sensitivity time control curve is generated, so that optimal control of the analog-digital converter(s) is possible and in which quantization can be performed with minimal distortion. This is attained in accordance with the invention in a sensitivity time control device in accordance with the preamble of the patent claim by the features in its characterizing part.

The object on which the invention is based is attained by a special control where the backscatter signal of the imaging radar system is continuously evaluated in real time so that it is always possible to determine an optimal sensitivity time control curve in this way. Also, because averaging of the power of the backscatter signal is performed in accordance with the invention, the average value of the backscatter power prior to analog-digital conversion stays always constant. With an optimal sensitivity time control, the average value of the backscatter signal power in the invention can always be kept independent of the range. Because of the special control, other critical components, such as the mixers in the IF section of the detector, can be additionally supported.

It is A particular advantage of the invention that the sensitivity time control curve is generated automatically and, if desired, constantly, and in this way is optimally adapted to the entire system. No Information is necessary regarding the terrain properties, the antenna diagram, the angle of incidence, the range nor regarding the loss nor the non-linearities of the imaging radar system used.

The invention will be described in detail below by means of a preferred embodiment.

BRIEF DESCRIPTION OF THE DRAWINGS

FIG. 2 is a block diagram of an embodiment of a sensitivity time control device in accordance with the invention.

DETAILED DESCRIPTION OF THE PREFERRED EMBODIMENT

Figure 1:
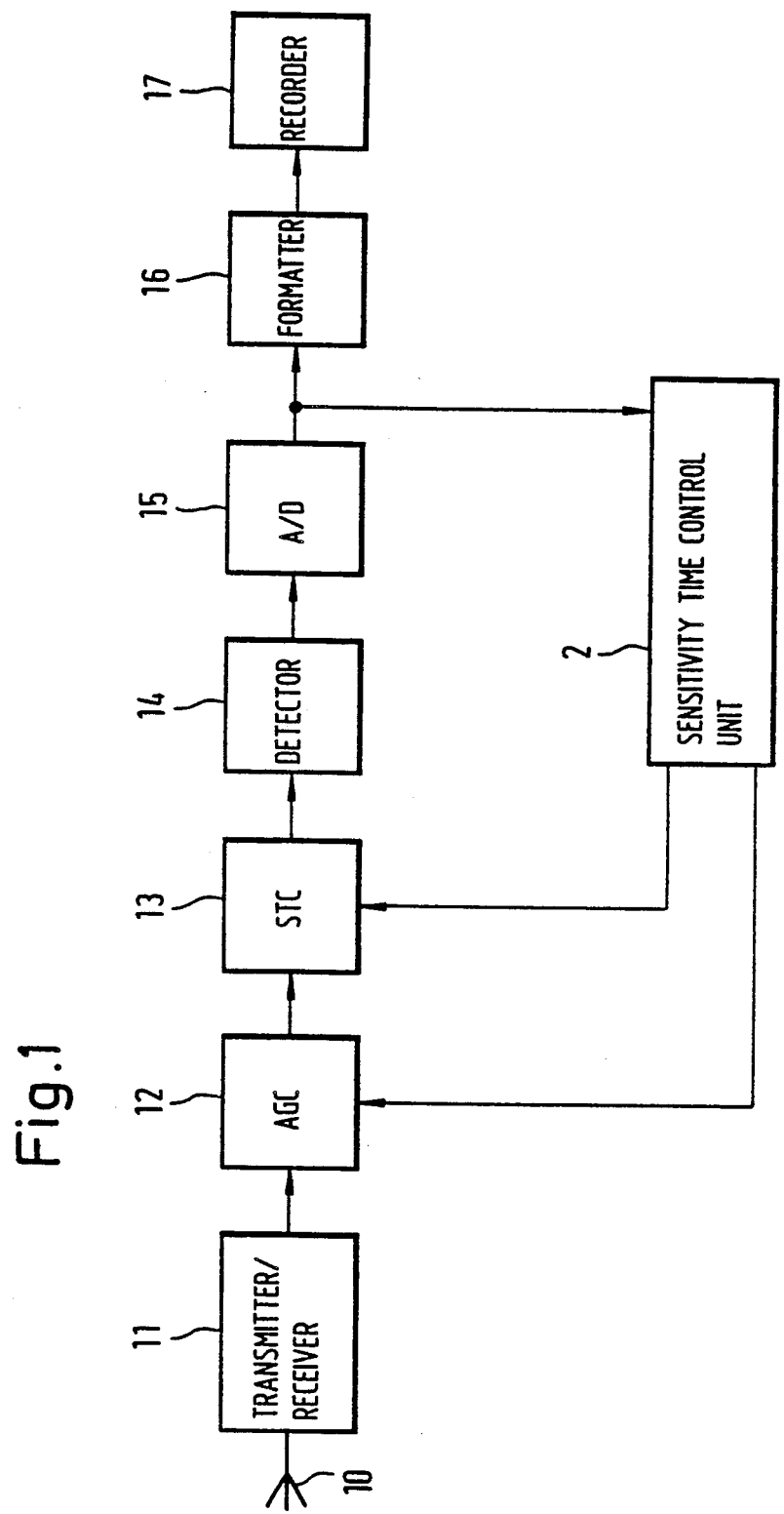
FIG. 1 is a block diagram of a conventional imaging radar system expanded by a sensitivity time control device 2 in accordance with the invention.

The sensitivity time control device 2, shown as a block in FIG. 1, is shown in detail in FIG. 2. The backscatter pulses e(k) received by means of the antenna 10 in FIG. 1 are amplified in the receiver device 11 and are applied via the two attenuators switched in series in the form of the automatic gain Control attenuator (AGC) 12 and the sensitivity time control attenuator (STC)13 and via the detector 14 to the A/D converter, where the backscatter signal e(k) generated from the backscatter pulses is digitized.

The digitized output values of the A/D converter 15 are averaged in a device 20 of the sensitivity time control device 2, which generates an average value. In this case the average value generation of the output curve of the digitized backscatter signal e(k) is carried out over several radar pulses (not over the range), so that the average backscatter signal power over the range can be estimated in this way.

The average backscatter signal power then is compared in a comparator device 21 with a reference level which corresponds to the desired nominal power. The output signal of the comparator device 21 is subsequently controlled in the control device 22; adaptive control takes place in an ideal on-off relay 221 of the control device 22. A device 224 for determining the control parameter d of the ideal on-off relay 221 is connected with it.

The following advantages are brought about with such an ideal on-off relay control. The amplification factor of the control path is not constant and can be greatly changed by the received backscatter signal e(k). However, in this connection the stability of the ideal on-off relay 221 does not depend on the amplification factor.

Because an integrating member 222 is switched downstream of the ideal on-off relay 221 it is possible to perform discrete operations very easily and quickly. Any self-oscillation of the control value occurring in this case does not disturb the system as long as the amplitude remains sufficiently small. The adaptation is also mainly used to shorten the response time and to keep the self-oscillation as low as possible.

The adaptation used is performed similar to the process of successive approximation. For this purpose an n-bit digital-analog (D/A) converter 23 is switched downstream of the control device 22 or the integrating member 222, by means of which the digital signal at the output of the control device 22 is converted into an analog voltage for the control of the sensitivity time control attenuator (SIC) 13, as indicated by the curve shown at the upper left of block 23.

Calculation of the parameter "d", by means of which the ideal on-off relay 221 is controlled, is again performed in accordance with already performed iteration steps. The integrating member 222 is initialized with $2^n/2$, which corresponds to half the range of the n-bit D/A converter. This Means that in the first iteration step the parameter of the ideal on-off relay 221 is set to ¼ of the n-bit range, i.e. $2^n/4$. In the course of the following iteration steps the value of the parameter "d" continues to be halved until $\frac{1}{2^n}$ of the n-bit range, i.e. 1, has been reached. If at this time more iteration steps are desired or required, the parameter of the ideal on-off relay 221 always remains one (1). Therefore control can be basically performed in n iteration steps(for example: n=8 for an 8-bit D/A converter).

Such a control is then performed in the sensitivity time control attenuator 13 for all range gates, so that as a result a sensitivity time control curve which depends on time is generated. Because in practical application the signal is still noisy after the average value generation in the device 20 because of the short integration time filtering is performed in the range direction before and after each iteration step in the actually employed circuit devices, however, this has not been separately shown in the block diagram of FIG. 2.

The output signal of the integrating member 222 is also applied to a device 223 for calculating the operating point of the automatic gain control attenuator 12. By means of optimal setting of the operating point of the automatic gain control attenuator (AGC) 12, corresponding optimization of the operating point of the sensitivity time control attenuator 13 is performed.

The algorithm for this can be described as follows: the sensitivity time control attenuator is initialized, i.e. by means of the initialization an amplification provided for the automatic gain control attenuator (AGC) 12. Subsequently a sensitivity time control curve is generated, as already described above. Following each such generation, the operational range of the attenuator in the form of the sensitivity time control attenuator (STC) 13 is checked.

If the operational range of the STC-attenuator is optimal, the sensitivity time control device reports to the user that control was successful. But if the operational range of the STC-attenuator is not optimal, a few amplification of the AGC attenuator 12 is calculated and programmed by the device 223.

It is then necessary to generate a new sensitivity time control curve, as already mentioned above. After performing the algorithm, the operational range of the A/D converter 15 as well as of the sensitivity time control attenuator (STC) 13 of the imaging radar system is optimized.

It is also possible to implement the sensitivity time control device in connection with sonar or lidar.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A sensitivity time control device for an imaging radar system having a transmission/receiving device for transmitting radar pulses (k) and for receiving backscatter pulses (e(k)), having an automatic gain control attenuator (12), a sensitivity time control attenuator (13), an analog-digital converter, having a formatting unit and having a recording unit, in the above sequence: said sensitivity time control device comprising:
   output signals of an analog-digital converter having an output;
   a means for generating an average value connected to said converter output and having an output;
   a control means (22) comprising:
   a ideal on-off relay (221) connected to said comparator device output and said ideal on-off relay having an output;
   an integrating member (222) connected to said ideal on-off relay (221) output, said member having an on output;
   means for determining (224) a control parameter (d) connected to said ideal on-off relay (221), and
   means for calculating (223) the operating point of said automatic gain control attenuator converter to said integrator member output;
   an n-bit digital analog converter (23) is connected to said control means 22 output; and
   the sensitivity time control attenuator (13) is connected to an output of said analog converter (23).

* * * * *